(12) United States Patent
Hada

(10) Patent No.: US 10,200,616 B2
(45) Date of Patent: Feb. 5, 2019

(54) IMAGE PROCESSING DEVICE THAT PERFORMS IMAGE ROTATION PROCESSING, METHOD OF CONTROLLING THE SAME, AND STORAGE MEDIUM

(71) Applicant: CANON KABUSHIKI KAISHA, Tokyo (JP)

(72) Inventor: Tetsuya Hada, Mitaka (JP)

(73) Assignee: Canon Kabushiki Kaisha, Tokyo (JP)

( * ) Notice: Subject to any disclaimer, the term of this patent is extended or adjusted under 35 U.S.C. 154(b) by 22 days.

(21) Appl. No.: 15/244,292

(22) Filed: Aug. 23, 2016

(65) Prior Publication Data
US 2017/0061581 A1 Mar. 2, 2017

(30) Foreign Application Priority Data

Aug. 26, 2015 (JP) ................................. 2015-166810

(51) Int. Cl.
*H04N 5/222* (2006.01)
*H04N 5/232* (2006.01)
*G06T 11/60* (2006.01)

(52) U.S. Cl.
CPC ......... *H04N 5/23293* (2013.01); *G06T 11/60* (2013.01); *H04N 5/23296* (2013.01)

(58) Field of Classification Search
CPC .................... H04N 5/23293; H04N 5/2628
USPC ........................ 348/333.02, 333.05
See application file for complete search history.

(56) References Cited

U.S. PATENT DOCUMENTS

| | | | | |
|---|---|---|---|---|
| 2009/0154835 A1* | 6/2009 | Weng | ................. | H04N 5/23293 382/296 |
| 2009/0167873 A1* | 7/2009 | Sakaue | ................... | B41J 2/175 348/207.2 |
| 2012/0092529 A1* | 4/2012 | Choi | ................. | H04N 5/23219 348/239 |
| 2015/0049234 A1* | 2/2015 | Jung | .................... | H04N 5/2258 348/333.05 |
| 2016/0044235 A1* | 2/2016 | Cho | .................... | H04M 1/0264 348/333.05 |

FOREIGN PATENT DOCUMENTS

JP 2008-177819 A 7/2008

* cited by examiner

*Primary Examiner* — Anthony J Daniels
(74) *Attorney, Agent, or Firm* — Cowan, Liebowitz & Latman, P.C.

(57) ABSTRACT

An image processing device capable of rotating an image through a desired rotation angle such that a display direction of an image matches a posture of a user. A first image pickup section acquires a main image, and a second image pickup section acquires a sub image. A display image formed by combining the main image and the sub image is displayed on a display section. Rotation instructions for rotating the main image and the sub image displayed on the display section are separately given. The main image and the sub image are rotated according to the respective rotation instructions. The main image and the sub image, on which rotation processing has been performed, respectively, are combined and displayed on the display section.

14 Claims, 10 Drawing Sheets

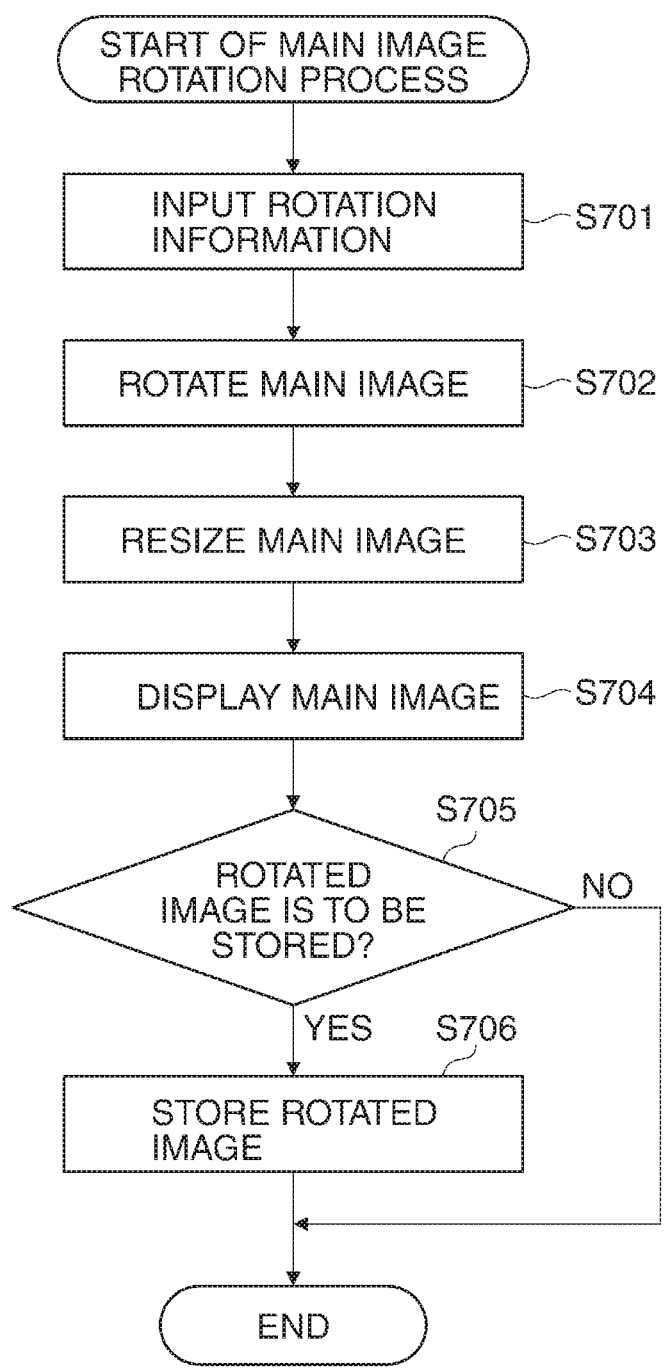

IMAGE PROCESSING DEVICE THAT PERFORMS IMAGE ROTATION PROCESSING, METHOD OF CONTROLLING THE SAME, AND STORAGE MEDIUM

BACKGROUND OF THE INVENTION

Field of the Invention

The present invention relates to an image processing device, a method of controlling the same, and a storage medium, and more particularly to an image processing device that performs image rotation processing and image display processing.

Description of the Related Art

In recent years, in an image pickup apparatus, such as a digital camera, as the capacity of a recording medium is increased, it is desired that the image pickup apparatus enables a user to efficiently view an image desired by the user. Further, as a terminal device, such as a mobile phone or a smartphone, there has been proposed one which is equipped with a plurality of image pickup sections, such as a first image pickup section for shooting an object and a second image pickup section for shooting a photographer. In such a terminal device, a photographer and an object are shot and recorded at the same time using the plurality of image pickup sections. Further, in viewing an image shot by the terminal device, it is desired that the image pickup apparatus is capable of efficiently displaying the image including the object and the image including the photographer.

On the other hand, there has been proposed one configured to determine, before displaying an image, a vertical direction of a face area by analyzing an image shot by an in-camera which is the second image pickup section, and switch the display direction of a displayed image between portrait and landscape such that the vertical direction of the displayed image matches the determined vertical direction (see e.g. Japanese Patent Laid-Open Publication No. 2008-177819). With this control, in Japanese Patent Laid-Open Publication No. 2008-177819, the vertical direction of a displayed image is caused to match the vertical direction of the face area, independently of a posture of the user or a manner of use of the terminal device, and a manner of holding of the terminal device by the user.

However, in the terminal device described in Japanese Patent Laid-Open Publication No. 2008-477819, unless a face area of a photographer (or a viewer) is correctly within an angle of view in an image shot by the in-camera, it is impossible to cause the display direction of an image to be displayed to match e.g. a posture of the user who is a viewer.

Further, in the terminal device described in Japanese Patent Laid-Open Publication No. 2008-177819, it is difficult to subject an image including an object and an image including a photographer to rotation processing through respective desired rotation angles.

SUMMARY OF THE INVENTION

The present invention provides an image processing device that is capable of always causing a display direction of an image to be displayed to match a posture of a user or the like, by subjecting an image to rotation processing through a desired rotation angle, a method of controlling the same, and a storage medium.

In a first aspect of the present invention, there is provided an image processing device comprising a first image pickup unit configured to acquire a first image, a second image pickup unit configured to acquire a second image, a display control unit configured to display a display image formed by combining the first image and the second image on a display section, an instruction unit configured to give an instruction for rotating the first image and the second image which are displayed on the display section, separately from each other, and a rotation processing unit configured to rotate the first image and the second image according to the instruction from the instruction unit, wherein the display control unit combines the first image and the second image, on which rotation processing has been performed by the rotation processing unit, for display on the display section.

In a second aspect of the present invention, there is provided a method of controlling an image processing device including a first image pickup unit that acquires a first image, a second image pickup unit that acquires a second image, and a display section, comprising displaying a display image formed by combining the first image and the second image on the display section, giving an instruction for rotating the first image and the second image which are displayed on the display section, separately from each other, and rotating the first image and the second image according to the instruction, and combining the first image and the second image, on which rotation processing has been performed, for display on the display section.

In a third aspect of the present invention, there is provided a non-transitory computer-readable storage medium storing a computer-executable program for executing a method of controlling an image processing device including a first image pickup unit that acquires a first image, a second image pickup unit that acquires a second image, and a display section, wherein the method comprises displaying a display image formed by combining the first image and the second image on the display section, giving an instruction for rotating the first image and the second image which are displayed on the display section, separately from each other, and rotating the first image and the second image according to the instruction, and combining the first image and the second image, on which rotation processing has been performed, for display on the display section.

According to the present invention, it is possible to subject an image to rotation processing through a desired rotation angle, and thereby always cause the display direction of an image to be displayed to match a posture of a user or the like.

Further features of the present invention will become apparent from the following description of exemplary embodiments (with reference to the attached drawings).

BRIEF DESCRIPTION OF THE DRAWINGS

FIG. 7 is a flowchart of a second image rotation process performed by the image pickup apparatus (digital camera) equipped with the image processing device according to the second embodiment.

DESCRIPTION OF THE EMBODIMENTS

The present invention will now be described in detail below with reference to the accompanying drawings showing embodiments thereof.

Figure 1:
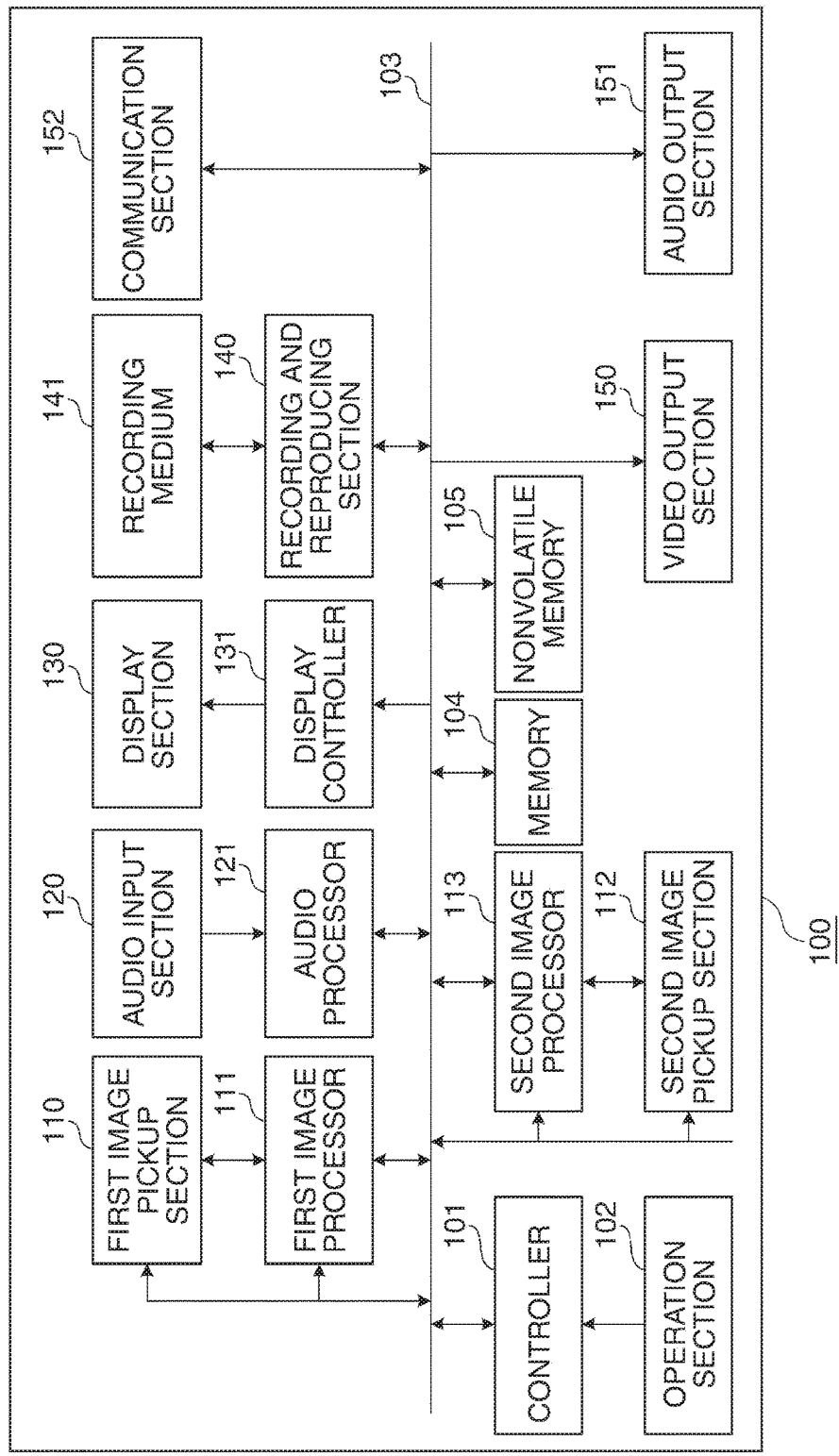
FIG. 1 a block diagram of an image pickup apparatus (digital camera) equipped with an image processing device according to a first embodiment of the present invention.

FIG. 1 a block diagram of an image pickup apparatus equipped with an image processing device according to a first embodiment of the present invention. Although the following description will be given of a digital camera (hereinafter simply referred to as the camera) as the image pickup apparatus, by way of example, the image pickup apparatus may be a terminal device, such as a mobile phone or a smartphone.

The camera, denoted by reference numeral 100, includes a controller 101, and the controller 101 includes a CPU (MPU), a memory (DRAM or SRAM), a nonvolatile memory (EEPROM), and so forth. The controller 101 controls the overall operation of the camera 100 by executing various programs recorded in the nonvolatile memory. Further, the controller 101 receives an operation signal from an operation section 102 that receives a user's operation, and controls the camera 100 according to the received operation signal. Further, the controller 101 analyzes an image obtained by first and second image processors 111 and 113, referred to hereinafter, and controls the camera 100 according to the analysis result.

The operation section 102 includes buttons (switches) for inputting various operations concerning image shooting, such as a power button, a still image-recording button, a moving image-recording start button, a zoom adjustment button, and an auto focus button (none of which are shown). Further, the operation section 102 is provided with a menu display button, an enter button, other cursor keys, a pointing device, a touch panel, and so forth (none of which are shown). When one of these keys or buttons is operated by a user, the operation section 102 sends an operation signal corresponding to the operation to the controller 101.

A bus 103 is a general-purpose bus for sending various data, a control signal, an instruction signal, and so forth, to blocks of the camera 100.

A nonvolatile memory 105 is an electrically erasable and recordable memory, and stores constants, programs, etc., used for the operation of the controller 101. A first image pickup section 110 and a second image pickup section 112 each control an amount of light of an optical image (object image) received through a lens, using a diaphragm, to cause the optical image to be formed on an image pickup device, such as a CCD sensor or a CMOS sensor. Then, the image pickup device outputs an image signal (analog image signal) corresponding to the optical image. Further, the first image pickup section 110 and the second image pickup section 112 each convert the analog image signal to a digital image signal by analog-to-digital conversion, and send the digital image signal to the first image processor 111 and the second image processor 113, respectively.

The first image processor 111 and the second image processor 113 each perform image quality adjustment processing on the digital image signal, so as to adjust white balance, colors, brightness, and so forth, based on preset settings, and outputs the image data.

Note that in the following description, image data as an output from the first image processor 111 is referred to as first image data, and image data as an output from the second image processor 113 is referred to as second image data. That is, the first image data is acquired by the first image pickup section 110 and the first image processor 111, and the second image data is acquired by the second image pickup section 112 and the second image processor 113.

The controller 101 sends the first image data and the second image data to a memory 104, a video output section 150, and a display controller 131, referred to hereinafter.

In the illustrated example, the first image pickup section 110 and the first image processor 111 are used for shooting an object, and are referred to as the out-camera in the present example. Further, the second image pickup section 112 and the second image processor 113 are used for shooting a photographer (or a viewer), and are referred to as the in-camera in the present example. That is, the first image pickup section 110 and the second image pickup section 112 are opposite in shooting direction from each other.

The above-described first image pickup section 110 and second image pickup section 112 are each equipped with an optical zoom function and an optical vibration reduction function. Further, the first image processor 111 and the second image processor 113 are each equipped with an electronic zoom function and an electronic vibration reduction function. Each or the optical zoom function and the electronic zoom function is a function for zooming in or out an image according to a user's operation. Further, each of the optical vibration reduction function and the electronic vibration reduction function is a function for preventing image shake caused by shake of the camera 100. These functions are simultaneously or alternately used under the control of the controller 101. Further, these functions are each sometimes singly used.

The first image pickup section 110 and the second image pickup section 112 each move a lens along an optical axis by using the optical zoom function according to a user's operation of a zoom key, not shown, to thereby zoom in or out the optical image. The first image processor 111 and the second image processor 113 each enlarge part cut out from an image obtained by the first image pickup section. 110 or the second image pickup section 112 by using the electronic zoom function according to a user's operation of the zoom key.

The first image pickup section 110 and the second image pickup section 112 each move the lens in a direction orthogonal to the optical axis by using the optical vibration reduction function based on an acceleration signal obtained by a vibration detection section (not shown) under the control of the controller 101 to thereby prevent image shake. The first image processor 111 and the second image processor 113 each prevent shake of an image obtained by the first image pickup section 110 and the second image pickup section 112 by using the electronic vibration reduction function based on the above-mentioned acceleration signal under the control of the controller 101.

Note that as to the electronic vibration reduction function, it is also possible to prevent image shake by shifting a pixel reading position on the image pickup device. These functions are already known, and hence detailed description thereof is omitted.

An audio input section. 120 collects voice (sound) around the camera 100 via an integrated non-directional microphone or an external microphone connected via an audio input terminal. Then, the audio input section 120 converts a signal of the collected sound to a digital audio signal by analog-to-digital conversion, and sends the digital audio signal to an audio processor 121.

The audio processor 121 optimizes the level of the digital audio signal by performing audio processing, such as optimization processing, and then outputs the digital audio signal to the controller 101. Then, the controller 101 records the digital audio signal in the memory 104 as audio data. As a result, the first image data, the second image data, and the audio data are temporarily stored in the memory 104.

The first image processor 111 and the second image processor 113 read out the first image data and the second image data, stored in the memory 104, and compress and encode the read image data to thereby generate first compressed image data and second compressed image data, respectively. Then, the controller 101 sends the first compressed image data and the second compressed image data to a recording and reproducing section 140.

Similarly, the audio processor 121 reads out the audio data stored in the memory 104, and compresses and encodes the audio data to thereby generate compressed audio data. The controller 101 sends the compressed audio data to the recording and reproducing section 140.

The recording and reproducing section 140 records the first compressed image data, the second compressed image data, the compressed audio data, control data (various data) concerning image shooting, and so forth, in a recording medium 141. In a case where the audio data is not compressed and encoded, the controller 101 sends the audio data, the first compressed image data, and the second compressed image data to the recording and reproducing section 140. Then, the recording and reproducing section 140 records the audio data, the first compressed image data, and the second compressed image data in the recording medium 141.

The recording medium 141 may be integrated in the camera 100, or may be removable from the camera 100. For example, as the recording medium 141, a hard disk, an optical disk, a magneto-optical disk, a CD-R, a DVD-R, a magnetic tape, a nonvolatile semiconductor memory, or a flash memory is used.

The recording and reproducing section. 140 reads out (i.e. reproduces) the first compressed image data, the second compressed image data, the compressed audio data (or audio data), various data, and so forth, which are recorded in the recording medium 141. Then, the controller 101 sends the first compressed image data, the second compressed image data, and the compressed audio data (or audio data) to the first image processor 111, the second image processor 113, and the audio processor 121, respectively.

The first image processor 111 and the second image processor 113 temporarily store the first compressed image data and the second compressed image data in the memory 104, respectively. The first image processor 111 and the second image processor 113 decode the first compressed image data and the second compressed image data according to respective predetermined procedures, and thereby obtain first image data and second image data. Then, the first image processor 111 and the second image processor 113 send the first image data and the second image data to the video output section 150 and the display controller 131, respectively.

Similarly, the audio processor 121 temporarily stores the compressed audio data in the memory 104. The audio processor 121 decodes the compressed audio data according to a predetermined procedure to thereby obtain audio data. Then, the audio processor 121 sends the audio data to an audio output section 151. In a case where the audio data is recorded in the recording medium 141 in an uncompressed state, the controller 101 directly sends the audio data to the audio output section 151.

The audio output section 151 includes e.g. an audio output terminal (not shown), and outputs sound corresponding to the audio data from an earphone or a loudspeaker, which is connected to the audio output terminal. The audio output section 151 may be a loudspeaker incorporated in the camera 100.

The video output section 150 includes e.g. a video output terminal, and displays images corresponding to the first image data and the second image data on an external display or the like connected to the video output terminal.

The audio output section 151 and the video output section 150 may include a single integrated output terminal, such as a HDMI (High-Definition Multimedia Interface: registered trademark) terminal.

The display controller 131 causes video (image) corresponding to the first image data and the second image data to be displayed on a display section 130. Further, the display controller 131 causes an operation screen (menu screen) for operating the camera 100, and so forth, to be displayed on the display screen 130 under the control of the controller 101. As the display section 130, there may be used any device, insofar as the device is a display device, such as a liquid crystal display, an organic EL display, or an electronic paper.

A communication section 152 is used for performing communication between the camera 100 and an external apparatus. The communication section 152 transmits and receives audio data, first image data, second image data, compressed audio data, first compressed image data, second compressed image data, and so forth, under the control of the controller 101.

Further, the communication section 152 transmits and receives control signals concerning image shooting, such as a shooting start command and a shooting end command, and other information, to and from the external apparatus. As the communication section 152, a wireless communication module, such as an infrared communication module, a Bluetooth (registered trademark) communication module, a wireless LAN communication module, a wireless USB, and a GPS receiver, is used.

Next, a description will be given of a shooting operation (normal operation) performed by the camera 100 shown in FIG. 1.

When a user operates the power button provided on the operation section 102, a start instruction is sent from the operation section 102 to the controller 101. In response to the start instruction, the controller 101 controls a power supply section (not shown) to supply power to the camera 100.

When power is supplied, the controller 101 checks whether a mode changing switch, not shown, provided on the operation section 102 is set to a still image-shooting mode, a moving image-shooting mode, or a reproduction mode. In the still image-shooting mode, when the user operates the still image-recording button provided on the operation section 102 in a shooting standby state, the controller 101 performs image shooting. Then, the first compressed image data and the second compressed image data are recorded in the recording medium. 141, as described above. After that, the controller 101 enters the shooting standby state.

In the moving image-shooting mode, when the user operates the moving image-recording start button provided on the operation section 102 in the shooting standby state, the controller 101 starts moving image shooting. Then, the first compressed image data, the second compressed image data, and the compressed audio data (or audio data) are recorded in the recording medium 141 until a moving image-recording end button, not shown, provided on the operation section 102 is operated. When the user operates the moving image-recording end button, the controller 101 terminates moving image shooting, and enters the shooting standby state.

In the reproduction mode, the controller 101 controls the recording and reproducing section 140 to reproduce the first compressed image data, the second image data, and the compressed audio data (or audio data) from the recording medium 141 according to user's selection. Then, sound corresponding to the audio data is output from the audio output section 151 as described above, and images corresponding to the first image data and the second image data are displayed on the display section 130.

Here, the still image-shooting mode performed by the camera 100 will be further described.

When the still image-shooting mode is set as mentioned above, the controller 101 places the camera 100 in the shooting standby state. In the shooting standby state, the first image processor 111 and the second image processor 113 send the first image data and the second image data to the display controller 131, respectively. Upon receipt of the image data, the display controller 131 causes images corresponding to the first image data and the second image data to be displayed on the display section 130. This enables the user to make preparations for image shooting while checking the screen displayed on the display section 130.

When the user operates the still image-recording button (i.e. gives one shooting instruction) in the shooting standby state, the controller 101 controls the camera 100 to perform the following operations.

The first image pickup section 110 and the second image pickup section 112 send digital image signals to the first image processor 111 and the second image processor 113, respectively, as described above. The first image processor 111 and the second image processor 113 perform image quality adjustment processing on the received digital image signals to thereby generate first image data and second image data, respectively. Then, the controller 101 sends the first image data and the second image data to the memory 104, the video output section 150, and the display controller 131. This enables the user to confirm a still image obtained through shooting by viewing the image displayed on the display section 130.

The first image processor 111 and the second image processor 113 read out the first image data and the second image data, which are stored in the memory 104, and compress and encode the read data, respectively. Then, the controller 101 outputs the first compressed image data and the second compressed image data to the recording and reproducing section 140. The recording and reproducing section 140 records the first compressed image data and the second compressed image data in the recording medium. 141 as still image files according to the file system management, such as UDF or FAT.

When compression and encoding processing performed by the first image processor 111 and the second image processor 113 is finished, the controller 101 places the camera 100 in the shooting standby state.

Next, the moving image shooting mode performed by the camera 100 shown in FIG. 1 will be further described.

When the moving image-shooting mode is set as mentioned hereinabove, the controller 101 places the camera 100 in the shooting standby state. In the shooting standby state, the first image processor 111 and the second image processor 113 send the first image data and the second image data to the display controller 131, respectively. Upon receipt of the image data, the display controller 131 causes images corresponding to the first image data and the second image data to be displayed on the display section 130. This enables the user to make preparations for image shooting while checking the screen displayed on the display section 130.

In the shooting standby state, when the user operates the moving image-recording start button, the controller 101 controls the camera 100 to perform the following operations.

The first image pickup section 110 and the second image pickup section 112 send digital image signals to the first image processor 111 and the second image processor 113, respectively, as described hereinabove. The first image processor 111 and the second image processor 113 perform image quality adjustment processing on the received digital image signals to thereby generate first image data and second image data, respectively. Then, the controller 101 sends the first image data and the second image data to the memory 104 and the display controller 131. The display controller 131 causes images (moving images) corresponding to the first image data and the second image data to be displayed on the display section 130.

On the other hand, a digital audio signal is sent from the audio input section 120 to the audio processor 121. The audio processor 121 optimizes the level of the digital audio signal and outputs the audio data, as described above. The controller 101 sends the audio data obtained by the audio processor 121 to the memory 104.

The first image processor 111, the second image processor 113, and the audio processor 121 generate first compressed image data, second compressed image data, and compressed audio data by performing the predetermined compression and encoding processing as described above. The controller 101 combines these first compressed image data, second compressed image data, and compressed audio data to thereby generate a data stream. The controller 101 outputs the generated data stream to the recording and reproducing section 140.

The recording and reproducing section 140 records the data stream in the recording medium 141 as one moving image file according to the file system management, such as UDF or FAT. In a case where the audio data is not compressed and encoded, the controller 101 combines the first compressed image data, the second compressed image data, and the audio data to thereby generate a data stream. The above-described operation is continuously performed until a moving image shooting end instruction is received.

The controller 101 controls the first image pickup section 110, the second image pickup section 112, the first image processor 111, the second image processor 113, and the audio processor 121 during moving image shooting according to a user's operation or according to a result of analysis of the first image data and the second image data. For example, the controller 101 controls the first image pickup section 110 and the second image pickup section 112 so as to perform operations, such as moving of the lens and adjusting of the aperture. Further, the controller 101 controls the first image processor 111, the second image processor 113, and the audio processor 121, so as to adjust the image data and the audio data.

Further, when the user operates the zoom key during moving image shooting, the controller 101 causes the optical zoom functions of the first image pickup section 110 and the second image pickup section 112 to operate, and the electronic zoom functions of the first image processor 111 and the second image processor 113 to operate. Note that during moving image shooting, the controller 101 causes the optical vibration reduction functions of the first image pickup section 110 and the second image pickup section 112 and the electronic vibration reduction functions of the first image processor 111 and the second image processor 113 to operate.

When the user operates the moving image-recording end button, the controller 101 controls the camera 100 in the following manner to perform processing for terminating moving image shooting.

The first image processor 111, the second image processor 113, and the audio processor 121 stop output of the first image data, the second image data, and the audio data, to the memory 104, respectively. Then, the first image processor 111, the second image processor 113, and the audio processor 121 read out the first image data, the second image data, and the audio data, remaining in the memory 104, and perform predetermined compression and encoding processing on the read first and second image data and the audio data, respectively.

The controller 101 combines the first compressed image data, the second compressed image data, and the compressed audio data to thereby generate a data stream, and outputs the generated data stream to the recording and reproducing section 140. In a case where the audio data is not compressed and encoded, the controller 101 combines the first compressed image data, the second compressed image data, and the audio data to thereby generate a data stream, and outputs the generated data stream to the recording and reproducing section 140.

The recording and reproducing section 140 records the data stream in the recording medium 141 as one moving image file as described above. When recording of the moving image file in the recording medium 141 is finished, the controller 101 controls the camera 100 in the following manner so as to generate thumbnail images.

First, the recording and reproducing section 140 reads out the first compressed image data and the second compressed image data at the leading frame of the moving image file recorded in the recording medium 141, and sends the read data to the first image processor 111 and the second image processor 113, respectively. The first image processor 111 and the second image processor 113 temporarily store the first compressed image data and the second compressed image data in the memory 104, respectively. Then, the first image processor 111 and the second image processor 113 decode the first compressed image data and the second compressed image data according to respective predetermined procedures to thereby obtain the first image data and the second image data.

Next, the first image processor 111 and the second image processor 113 perform predetermined compression and encoding processing on the first image data and the second image data, for thumbnail use, to thereby generate first compressed image data and second compressed image data for thumbnail use. Then, the controller 101 outputs the first compressed image data and the second compressed image data for thumbnail use to the recording and reproducing section 140.

The recording and reproducing section 140 writes the first compressed image data and the second compressed image data for thumbnail use in the recording medium. 141 in a manner associated with the original moving image file according to the file system management, such as UDF or FAT. Then, after completing the moving image file, the recording and reproducing section 140 stops the recording operation. When the recording operation is stopped, the controller 101 controls the camera 100 to shift to the shooting standby state.

Note that the controller 101 stores a copyright holder name and an author name in the nonvolatile memory 105 according to a user's operation of the operation section 102. Then, the controller 101 changes the copyright holder name and the author name stored in the nonvolatile memory 105 whenever the operation section 102 is operated. The copyright holder name and the author name stored in the nonvolatile memory 105 are recorded in a still image file or a moving image file as metadata according to shooting processing.

Incidentally, the out-camera and the in-camera each can be switched to one of the still image shooting mode and the moving image shooting mode. For example, when the out-camera and the in-camera are both in the still image shooting mode, two still image files are simultaneously recorded in the recording medium 141. When the out-camera and the in-camera are both in the moving image shooting mode, two moving image files are simultaneously recorded in the recording medium 141. Further, when one of the out-camera and the in-camera is in the still image shooting mode and the other is in the moving image shooting mode, one still image file and one moving image file are simultaneously recorded in the recording medium 141.

Next, the reproduction mode performed by the camera 100 will be further described.

When the reproduction mode is set via the operation section 102, the controller 101 shifts the camera. 100 to a reproduction state, and controls the camera 100 to perform the following operations.

The recording and reproducing section 140 reads out a still image file or a moving image file, which has been recorded in the recording medium 141, under the control of the controller 101. Note that the following description is given assuming that a moving image file is read out.

The controller 101 sends the first compressed image data, the second compressed image data, and the compressed audio data of the moving image file to the first image processor 111, the second image processor 113, and the audio processor 121, respectively. In a case where the audio data is not compressed and encoded, the controller 101 sends the audio data directly to the audio output section 151.

The first image processor 111, the second image processor 113, and the audio processor 121 temporarily store the first compressed image data, the second compressed image data, and the compressed audio data in the memory 104, respectively. Then, the first image processor 111, the second image processor 113, and the audio processor 121 decode the first compressed image data, the second compressed image data, and the compressed audio data according to respective predetermined procedures.

The controller 101 sends the audio data obtained as a result of decoding processing to the audio output section 151, and the first image data and the second image data obtained as a result of decoding processing to the video output section 150 and the display controller 131. The display controller 131 causes video (images) corresponding to the first image data and the second image data to be displayed on the display section 130. On the other hand, the audio output section 151 outputs sound corresponding to the audio data from the integrated loudspeaker or the earphone or loudspeaker connected to the audio output section 151.

Next, a description will be given of an image rotation process performed by the camera 100 shown in FIG. 1 in the reproduction mode.

Figure 2A:
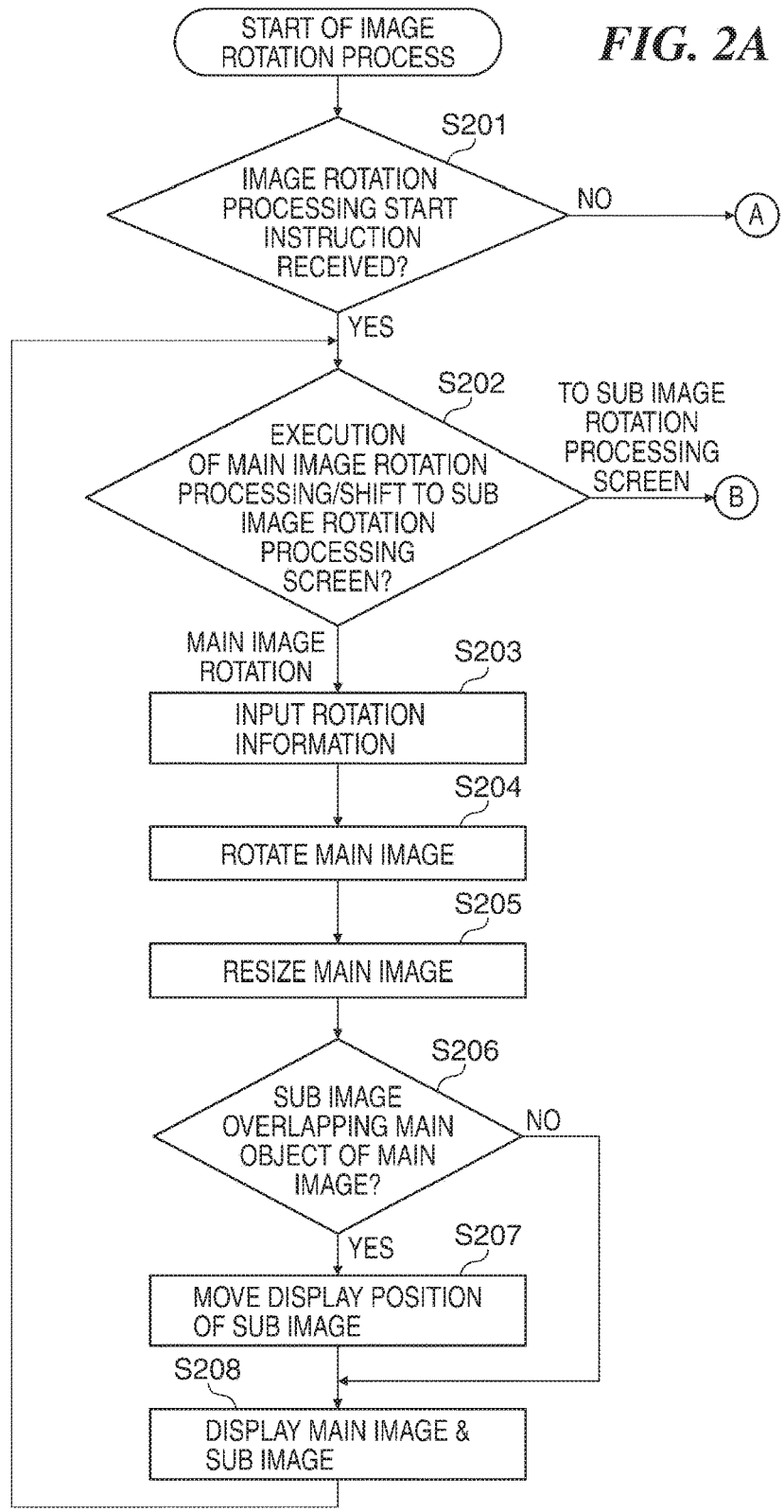
FIGS. 2A and 2B are a flowchart of an image rotation process performed by the camera shown in FIG. 1.
Figure 2B:
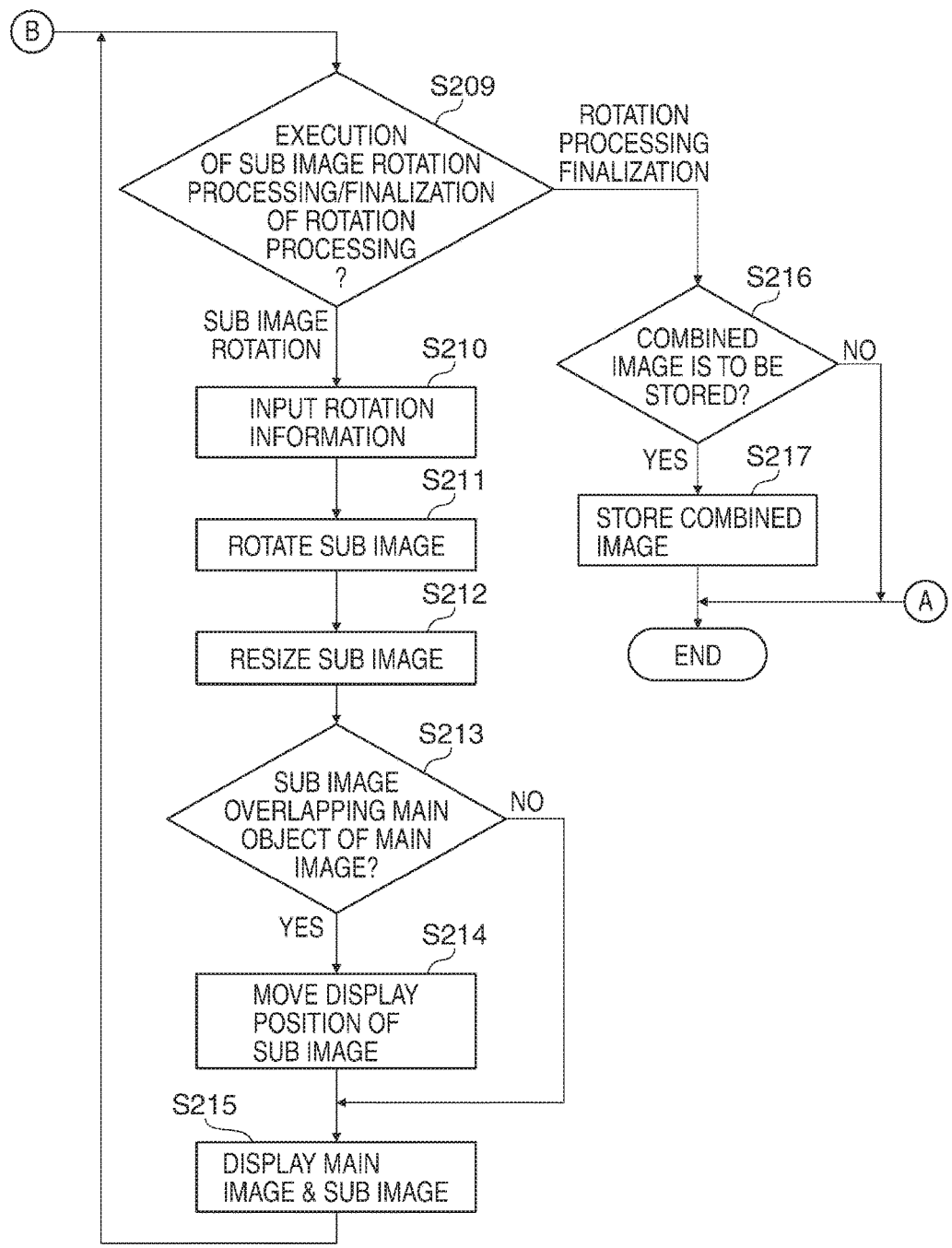

FIGS. 2A and 2B are a flowchart, of the image rotation process performed by the camera 100 shown in FIG. 1.

Note that the image rotation process in FIG. 2 is performed under the control of the controller 101. Further, in the following description, an image displayed on the display section 130 according to the first image data is referred to as the main image, and an image displayed on the display section 130 according to the second image data is referred to as the sub image.

Figure 3A:
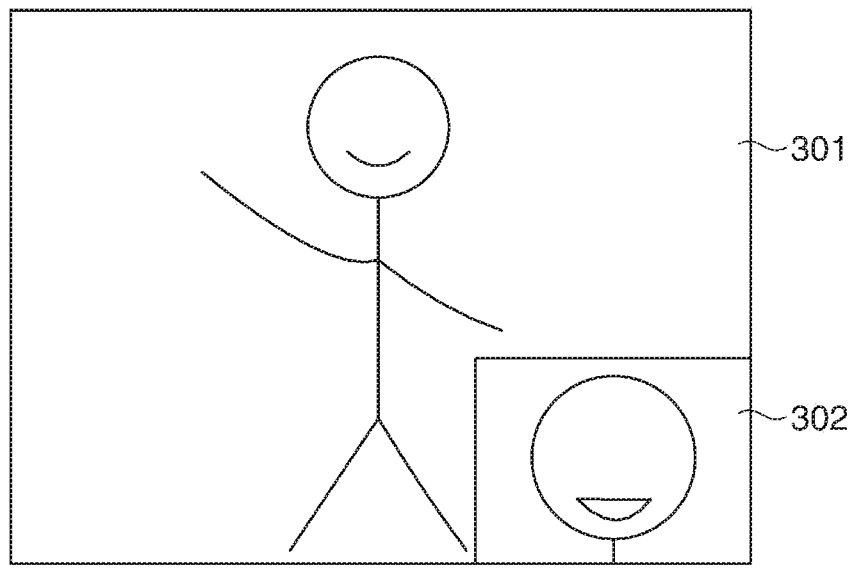
FIG. 3A is a diagram showing a screen displayed before rotation processing, which is useful in explaining an example of display of a main image and a sub image on a display section appearing in FIG. 1.
Figure 3B:
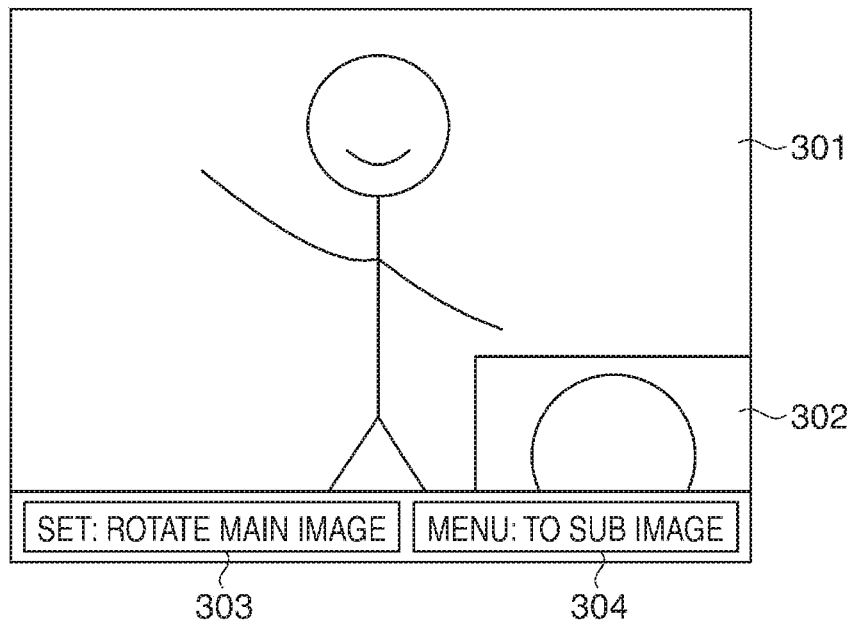
FIG. 3B is a diagram, similar to FIG. 3A, showing a screen for inquiring about whether or not to subject the main image to rotation processing.

FIGS. 3A and 3B are diagrams useful in explaining examples of display of the main image and the sub image, on the display section 130 appearing in FIG. 1, in which FIG. 3A shows a screen displayed before rotation processing, and FIG. 3B shows a screen for inquiring about whether or not to subject the main image to rotation processing.

Now, let it be assumed that the screen shown in FIG. 3A is being displayed on the display section 130. Here, the sub image, denoted by reference numeral 302, is superimposed on the main image, denoted by reference numeral 301, and the sub image 302 is displayed in a lower right corner of the screen. Note that it is assumed that the controller 101 controls the display controller 131 to display at least one of the main image 301 and the sub image 302.

First, the controller 101 determines whether or not a rotation processing start instruction for stating rotation processing of one of the main image and the sub image has been received via the operation section 102 (step S201). If the rotation processing start instruction has not been received (NO to the step S201), the controller 101 terminates the image rotation process.

On the other hand, if the rotation processing start instruction has been received (YES to the step S201), the controller 101 proceeds to a step S202, wherein the controller 101 displays "SET: ROTATE MAIN IMAGE" (SET button) 303 and "MENU: TO SUB IMAGE" (MENU button) 304 in a lower area of the screen on the display section 130 (see FIG. 3B), and determines whether an instruction for executing main image rotation processing has been given by operating the SET button 303, or an instruction for shifting the screen to a sub image rotation processing screen has been given by operating the MENU button 304.

Note that when the MENU button 304 is operated, the controller 101 shifts the process to sub image rotation processing.

If the user operates the SET button 303 via the operation section 102 on the screen shown in FIG. 3B ("MAIN IMAGE ROTATION" to the step S202), the controller 101 proceeds to a step S203, wherein rotation information indicative of a rotation direction and a rotation angle is input. Here, for example, as the rotation direction, a clockwise direction from the normal position shown in FIG. 3A is designated, and as the rotation angle, one of 90 degrees, 180 degrees, and 270 degrees is designated.

Then, the controller 101 rotates the main image according to the input rotation information (step S204). The controller 101 resizes (zooms in or zooms out) the main image according to the display area on the display section. 130 (step S205). After that, the controller 101 determines whether or not a main object existing in the main image and the sub image at least partially overlap each other in display position (step S206).

If it is determined that the main object and the sub image overlap each other in display position (YES to the step S206), the controller 101 moves the display position of the sub image to a position where the sub image does not overlaps the main object (step S207). That is, the controller 101 changes the relative display position between the main image and the sub image. Then, the controller 101 displays the resized main image and the sub image on the display section 130 (step S208). Then, the controller 101 returns to the step S202.

Figure 4A:
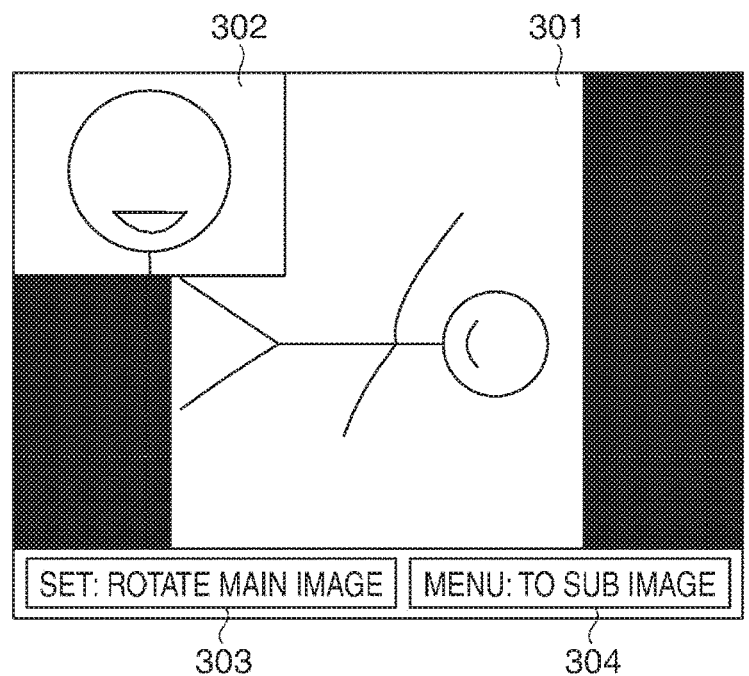
FIG. 4A as a diagram showing a screen after the main image appearing in FIG. 3B has been rotated.
Figure 4B:
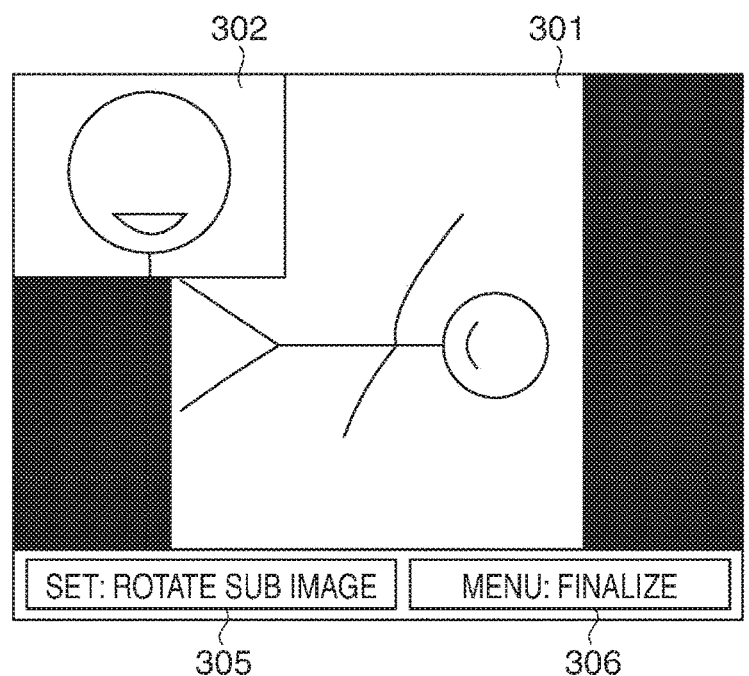
FIG. 4B is a diagram showing a screen for inquiring about whether or not to subject the sub image appearing in FIG. 4A to rotation processing.

FIGS. 4A and 4B are diagrams useful in explaining other examples of display of the main image and the sub image on the display section 130 appearing in FIG. 1, in which FIG. 4A shows a screen displayed after the main image has been rotated, and FIG. 4B shows a screen for inquiring about whether or not to subject the sub image to rotation processing, which is displayed as a result of the operation of the MENU button 304 on the screen shown in FIG. 4A.

The illustrated example in FIG. 4A shows the screen displayed in a case where the SET button 303 has been operated on the screen shown in FIG. 3B, causing the main image to be rotated in the clockwise direction by 90 degrees. In this case, however, the sub image as appearing in FIG. 3A comes to overlap the main object (face in this example) of the rotated main image in display position, and hence, to avoid this, the display position of the sub image is moved to an upper left corner of the screen. Note that when moving the display position of the sub image, it is assumed, for example, that the display position is moved to one of four corners of the screen.

On the other hand, if it is determined that the sub image does not overlap the main object in display position (NO to the step S206), the controller 101 displays the resized main image and the sub image on the display section. 130 without moving the display position of the sub image in the step S208.

If it is determined that the MENU button. 304 has been operated on the screen shown in FIG. 3B or 4A, whereby the instruction for shifting the screen to the sub image rotation processing screen has been given ("TO SUB IMAGE ROTATION PROCESSING SCREEN" to the step S202), the controller 101 displays "SET: ROTATE SUB IMAGE" (SET button) 305 and "MENU: FINALIZE" (MENU button) 306 in the lower area of the screen on the display section 130, and determines whether the SET button 305 has been operated to instruct execution of sub image rotation processing or the MENU button 306 has been operated to instruct finalization of rotation processing (step S209) (see FIG. 4B). Thus, the controller 101 prompts the user to rotate the sub image.

If the user operates the SET button 305 on the screen shown in FIG. 4B as the operation section 102 ("SUB IMAGE ROTATION" to the step S209), the controller 101 proceeds to a step S210, wherein rotation information indicative of a rotation direction and a rotation angle are input. Then, the controller 101 rotates the sub image according to the input rotation information (step S211). The controller 101 resizes (zooms in or zooms out) the sub image according to the display area on the display section 130 (step S212). Then, the controller 101 determines whether or not the main object existing in the main image and the sub image at least partially overlap each other in display position (step S213).

If the main object and the sub image overlap each other in display position (YES to the step S213), the controller 101 moves the display positron of the sub image to a position where the sub image does not overlap the main object (step S214). Then, the controller 101 displays the main image (resized in a case where the step S205 was executed) and the resized sub image on the display section 130 (step S215). After that, the controller 101 returns to the step S209.

On the other hand, if the main object and the sub image do not overlap each other in display position (NO to the step S213), the controller 101 displays the main image (resized in a case where the step S205 was executed) and the resized sub image on the display section 130 without moving the display position of the sub image.

Figure 5A:
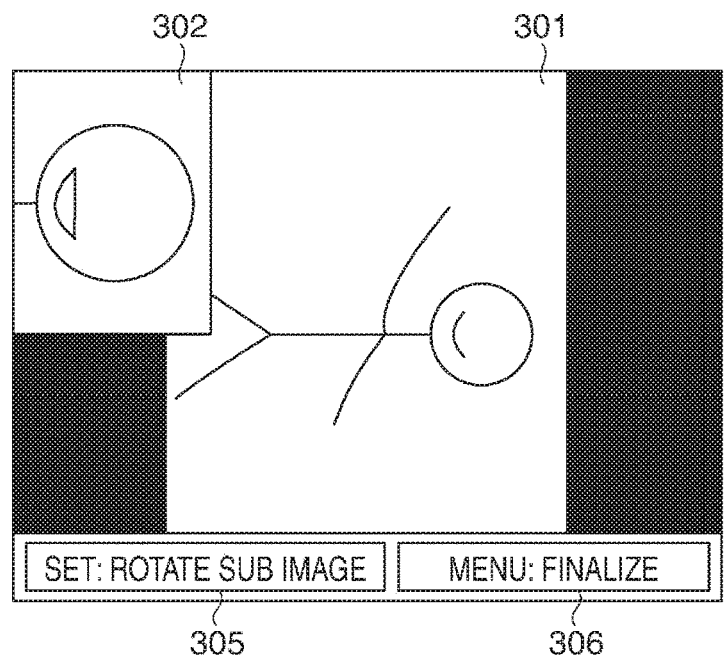
FIG. 5A is a diagram showing a screen after the sub image appearing in FIG. 4B has been rotated.
Figure 5B:
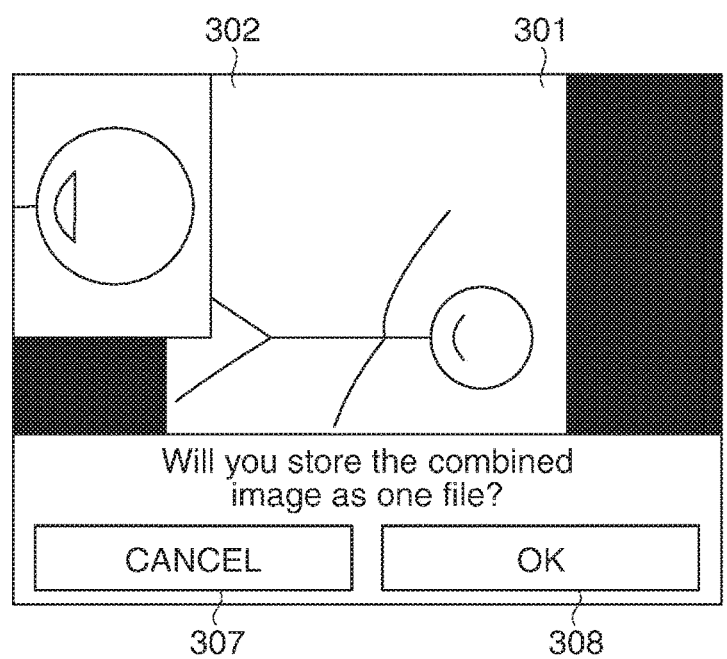
FIG. 5B is a diagram, similar to FIG. 5A, showing a screen for inquiring about whether or not to store the image subjected to rotation processing, shown in FIG. 5A.

FIGS. 5A and 5B are diagrams useful in explaining still other examples of display of the main image and the sub image on the display section. 130 appearing in FIG. 1, in which FIG. 5A shows a screen displayed after the sub image has been rotated, and FIG. 5B shows a screen for inquiring about whether or not to store the image thus far subjected to rotation processing.

The illustrated example in FIG. 5A shows the screen displayed when the SET button 305 has been operated in the state shown in FIG. 4B, causing the sub image to be rotated in the clockwise direction by 270 degrees. In this case, the main object (face in the present example) of the main image shown in FIG. 4B and the sub image do not overlap each other, and hence the display position of the sub image is not changed.

If the MENU button. 306 has been operated in the state shown in FIG. 4B to thereby instruct finalization of rotation processing ("ROTATION PROCESSING FINALIZATION" to the step S209), the controller 101 displays the screen shown in FIG. 5B on the display section 130, and inquires of the user about whether or not to store the image (combined image) subjected to rotation processing (step S216). If the user selects a "CANCEL" button 307 in this state (NO to the step S216), the controller 101 terminates the image rotation process without storing the combined image.

On the other hand, if the user selects an "OK" button 308 (YES to the step S216), the controller 101 proceeds to a step S217, wherein the combined image is stored in the recording medium 141 by the recording and reproducing section 140. At this time, the controller 101 stores, in the recording medium 141, the rotation information indicative of the rotation direction and rotation angle of each of the main image and the sub image, which was input for the rotation processing. Note that if the main image and the sub image are Exif-compliant JPEG image files, the rotation direction and the rotation angle may be described according to the definition of an orientation tag. Then, the controller 101 terminates the image rotation process.

Note that when only a main image has been rotated, such a combined image as shown in FIG. 4A is recorded. Further, when only a sub image has been rotated, a combined image in which only the sub image has been rotated is recorded.

As described above, in the first embodiment of the present invention, it is possible to rotate a main image and a sub image in a desired rotation direction through a desired rotation angle, and as a result, it is possible to always adjust the display direction of an image to be displayed to a posture of a user or the like.

Next, a description will be given of a second embodiment of the present invention. An image pickup apparatus (camera) equipped with an image processing device according to the second embodiment will be described. Note that the image pickup apparatus (camera) equipped with the image processing device according to the second embodiment has the same configuration as that of the camera shown in FIG. 1.

Incidentally, image shooting is not always performed by operating both of the in-camera and the out-camera, but is sometimes performed by operating only the out-camera without operating the in-camera. That is, when shooting a main image, a sub image is selectively shot.

Therefore, in the present embodiment, when image shooting is performed by operating both of the in-camera and the out-camera, the controller 101 adds a management flag (also referred to as the management information) indicative of whether or not second image data associated with first image data exists to a still image file or a moving image file (hereinafter referred to as the image file). Then, when performing rotation processing, the controller 101 refers to the management flag, and switches the rotation processing as described hereinafter.

Figure 6:
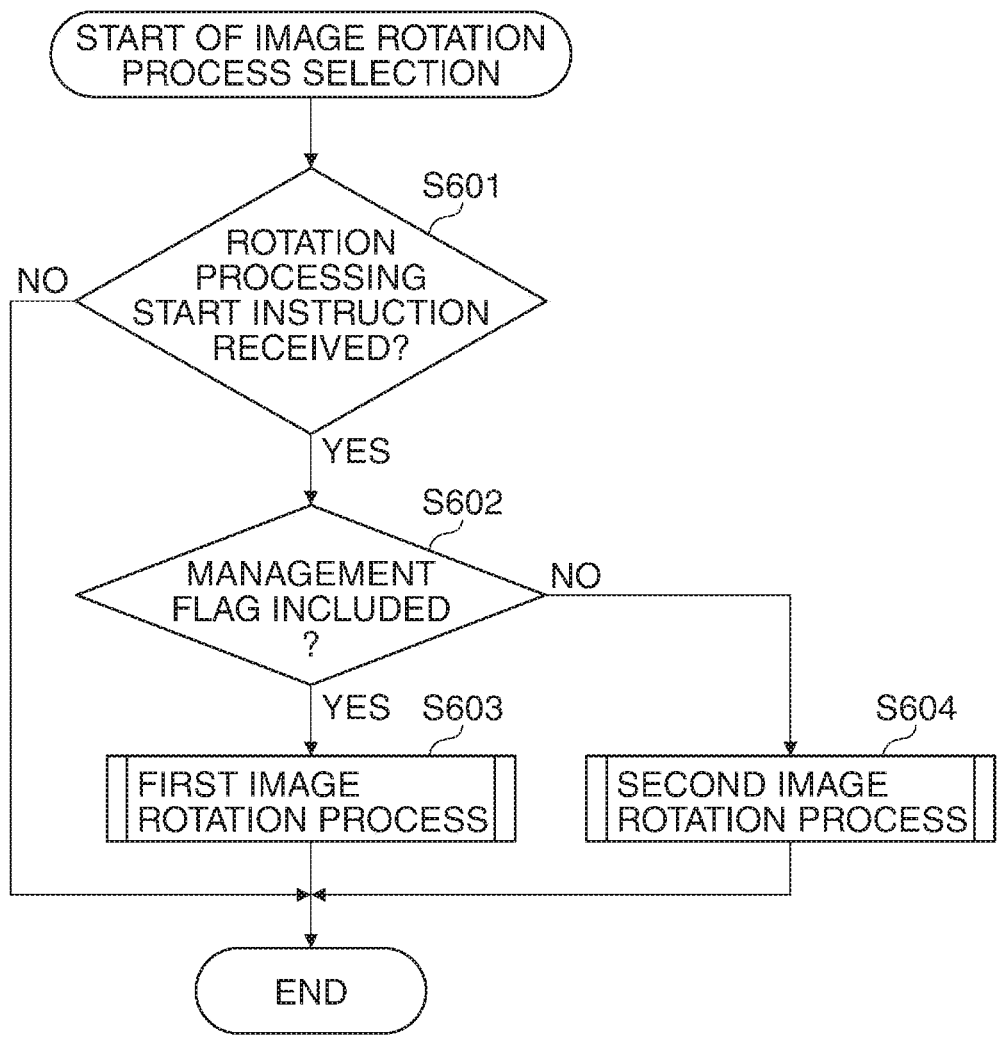
FIG. 6 is a flowchart of an image rotation process selection process performed by an image pickup apparatus (digital camera) equipped with an image processing device according to a second embodiment of the present invention.

FIG. 6 is a flowchart of an image rotation process selection process performed by the image pickup apparatus (camera) equipped with the image processing device according to the second embodiment of the present invention.

First, the controller 101 determines whether or not a rotation processing start instruction for starting rotation processing of an image has been received via the operation section 102 (step S601). If the rotation processing start instruction has not been received (NC) to the step S601), the controller 101 terminates the image rotation process selection process.

On the other hand, if the rotation processing start instruction has been received (YES to the step S601), the controller 101 determines whether or not a management flag is included in an image file on which rotation processing is to be performed (step S602). If a management flag is included (YES to the step S602), the controller 101 performs a first image rotation process (step S603), and terminates the image rotation process selection process. Note that the first image rotation process is the same as the image rotation process in FIGS. 2A and 2B except that the step S201 is excluded therefrom.

If no management flag is included (NO to the step S602), the controller 101 performs a second image rotation process (step S604), and terminates the image rotation process selection process. Note that the second image rotation process is a process for rotating a main image.

FIG. 7 is a flowchart of the second image rotation process performed by the image pickup apparatus (camera) equipped with the image processing device according to the second embodiment.

Figure 8A:
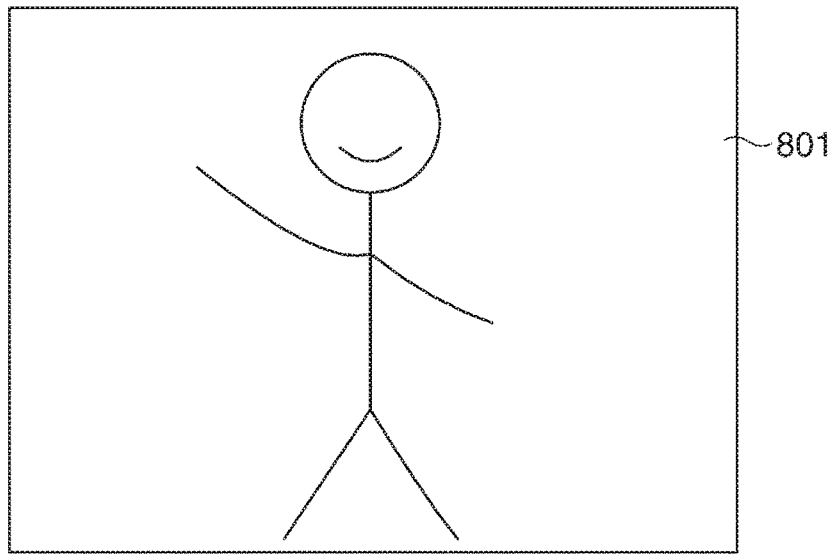
FIG. 8A is a diagram showing a screen displayed before rotation processing, which is useful in explaining an example of a main image displayed on a display section of the image pickup apparatus (digital camera) equipped with the image processing device according to the second embodiment.
Figure 8B:
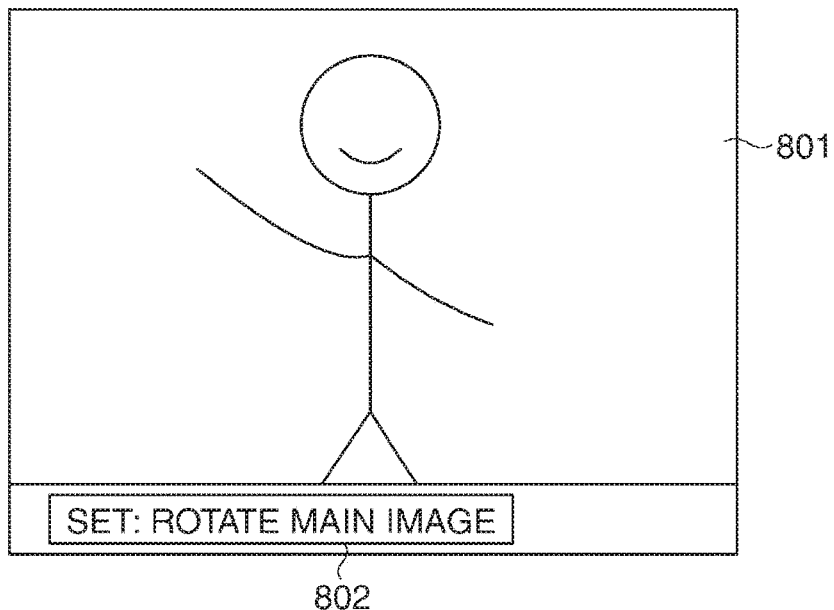
FIG. 8B is a diagram, similar to FIG. 8A, showing a screen for inquiring about whether or not to subject the main image to rotation processing.

Further, FIGS. 8A and 8B are diagrams useful in explaining examples of display of a main image on the display section 130 of the image pickup apparatus (camera) equipped with the image processing device according to the second embodiment, in which FIG. 8A shows a screen displayed before rotation processing, and FIG. 8B shows a screen for inquiring about whether or not to subject the main image to rotation processing.

Now, let it be assumed that the screen shown in FIG. 8A is displayed on the display section 130. The controller 101 displays a "SET: ROTATE MAIN IMAGE" (SET button) 802 in a lower area of the screen on the display section 130 (see FIG. 8B). Thus, the controller 101 prompts the user to rotate the main image.

The user refers to the screen shown in FIG. 8B, and inputs rotation information indicative of a rotation direction and a rotation angle by operating the SET button via the operation section 102 (step S701). Here, for example, as the rotation direction, a clockwise direction from the normal position shown in FIG. 3A is designated, and as the rotation angle, one of 90 degrees, 180 degrees, and 270 degrees is designated.

Then, the controller 101 rotates the main image according to the input rotation information (step S702). The controller 101 resizes (zooms in or zooms out) the main image according to the display area on the display section 130 (step S703). Then, the controller 101 displays the resized main image on the display section 130 (step S704).

Figure 9:
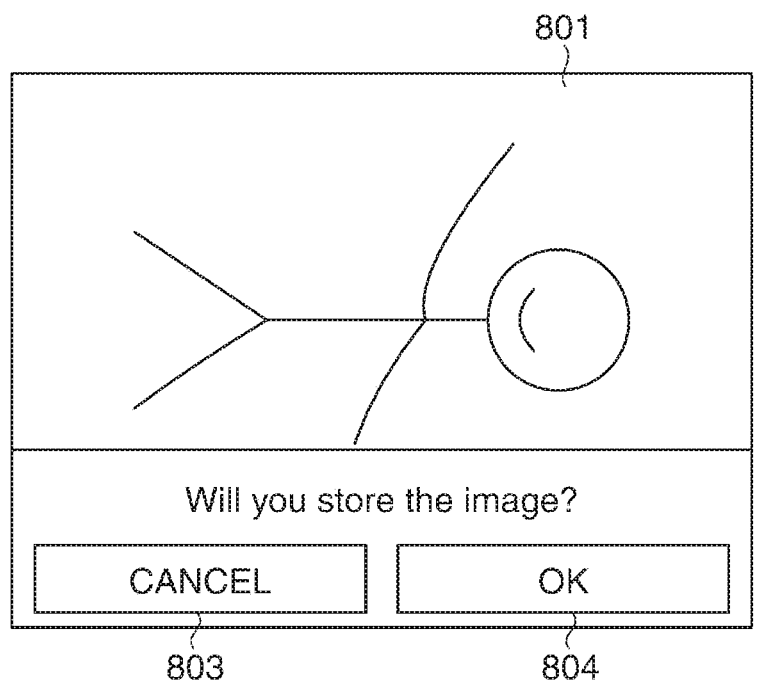
FIG. 9 is a diagram showing a screen after the main image has been rotated, which is displayed by the image pickup apparatus (digital camera) equipped with the image processing device according to the second embodiment.

FIG. 9 is a diagram showing a screen after the main image has been rotated, which is displayed by the image pickup apparatus (camera) equipped with the image processing device according to the second embodiment.

The screen shown in FIG. 9 displays the rotated main image, and displays an inquiry about whether or not to store the rotated main image.

After execution of the step S704, the controller 101 determines whether or not the user has selected storage of the main image subjected to rotation processing (rotated image) step S705). If the user selects a "CANCEL" button 803 (NO to the step S705), the controller 101 terminates the image rotation process without storing the rotated image.

On the other hand, if the user selects an "OK" button 804 (YES to the step S705), the controller 101 controls the recording and reproducing section 140 to store the rotated image in the recording medium 141 (step S706). At this time, the controller 101 stores, in the recording medium 141, the rotation information indicative of the rotation direction and the rotation angle of the main image, which was input for the rotation processing. Then, the controller 101 terminates the rotation process.

As described above, in the second embodiment, the controller 101 determines whether or not a main image accompanies a sub image to thereby select rotation processing. Therefore, the user can easily perform processing for rotating a main image alone or a main image and a sub image, without checking whether or not the main image accompanies a sub image.

As is clear from the above description, in the illustrated example in FIG. 1, the controller 101 and the operation section 102 function as an instruction unit. Further, the controller 101, the first image pickup section 110 and the first image processing device 11 function as a first image pickup unit, and the controller 101, the second image pickup section 112, and the second image processor 113 function as a second image pickup unit. Further, the controller 101 functions as a display control unit and a rotation processing unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Further, the image processing device may be caused to perform a control method comprising control steps corresponding to the functions of the above-described embodiments.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

This application claims the benefit of Japanese Patent Application No. 2015-166810 filed Aug. 26, 2015, which is hereby incorporated by reference herein in its entirety.

What is claimed is:
1. An image processing device comprising:
a first image pickup unit configured to acquire a first image;
a second image pickup unit configured to acquire a second image; a display control unit configured to display a display image formed by combining the first image and the second image on a display section;
an instruction unit configured to give a first instruction for rotating the first image and a second instruction for rotating the second image which are displayed on the display section, separately from each other; and
a rotation processing unit rotating the first image according to the first instruction from said instruction unit, determining after the rotation of the first image whether at least one object of the second image overlaps at least one object of the first image, and rotating the second image according to the second instruction from said instruction unit when is it is determined after the rotation of the first image that there is overlap;
wherein said display control unit combines the first image and the second image, on both of which rotation processing has been performed by said rotation processing unit, for display on the display section.

2. The image processing device according to claim 1, wherein said first image pickup unit and said second image unit are different in an image shooting direction from each other.

3. The image processing device according to claim 2, wherein the first image is higher in resolution than the second image, and said second image pickup unit performs image shooting of a photographer.

4. The image processing device according to claim 1, wherein said rotation processing unit can change a relative display position between the first image and the second image.

5. The image processing device according to claim 4, wherein the rotation processing unit changes the display position of the second image when it is determined that at least one object of the second image overlaps at least one object of the first image after rotation.

6. The image processing device according to claim 1, wherein upon receipt of an instruction for rotating the first image, said rotation processing unit inquires of a user whether or not to rotate the second image.

7. The image processing device according to claim 1, further comprising a recording unit configured to store rotation information input for the rotation processing of each of the first image and the second image in a recording medium.

8. The image processing device according to claim 1, wherein after displaying the combined first and second images, on both of which rotation processing has been performed on the display section, the instruction unit request a confirmation from a user to store the combined and rotated first and second images as a single new image in memory.

9. A method of controlling an image processing device including a first image pickup unit that acquires a first image, a second image pickup unit that acquires a second image, and a display section, comprising:
  displaying a display image formed by combining the first image and the second image on the display section;
  giving a first instruction for rotating the first image and a second instruction for rotating the second image which are displayed on the display section, separately from each other;
  rotating the first image according to the first instruction;
  determining after performing rotation of the first image whether at least one object of the second image overlaps at least one object of the first image;
  rotating the second image according to the second instruction from said instruction unit when is it is determined after the rotation of the first image that there is overlap; and
  combining the first image and the second image, on both of which rotation processing has been performed, for display on the display section.

10. The method of claim 9, further comprising the step of changing the display position of the second image when it is determined that at least one object of the second image overlaps at least one object of the first image after rotation.

11. The method according to claim 9, further comprising:
  requesting and processing a confirmation from a user, after displaying the combined first and second images, on both of which rotation processing has been performed on the display section, to store the combined and rotated first and second images as a single new image in memory.

12. A non-transitory computer-readable storage medium storing a computer-executable program for executing a method of controlling an image processing device including a first image pickup unit that acquires a first image, a second image pickup unit that acquires a second image, and a display section,
  wherein the method comprises:
  displaying a display image formed by combining the first image and the second image on the display section;
  giving a first instruction for rotating the first image and a second instruction for rotating the second image which are displayed on the display section, separately from each other;
  rotating the first image according to the first instruction;
  determining after performing rotation of the first image whether at least one object of the second image overlaps at least one object of the first image;
  rotating the second image according to the second instruction from said instruction unit when is it is determined after the rotation of the first image that there is overlap; and
  combining the first image and the second image, on both of which rotation processing has been performed, for display on the display section.

13. The apparatus of claim 12, wherein the computer-executable program further operates to change the display position of the second image when it is determined that at least one object of the second image overlaps at least one object of the first image after rotation.

14. The storage medium according to claim 12, wherein the computer-executable program for executing a method of controlling the image processing device further comprises:
  requesting and processing a confirmation from a user, after displaying the combined first and second images, on both of which rotation processing has been performed on the display section, to store the combined and rotated first and second images as a single new image in memory.

* * * * *